May 29, 1956 F. J. GAFFNEY ET AL 2,748,276

SHIELDED-LINE TUNABLE RESONATOR

Filed Nov. 27, 1951

INVENTOR
FRANCIS J. GAFFNEY
HERBERT A. FINKE

BY Ralph B. Stewart
ATTORNEY 2,748,276

SHIELDED-LINE TUNABLE RESONATOR

Francis J. Gaffney, Malverne, and Herbert A. Finke, Brooklyn, N. Y., assignors to Polytechnic Research and Development Company Incorporated, Brooklyn, N. Y., a corporation of New York Application November 27, 1951, Serial No. 258,494

6 Claims. (Cl. 250—36)

This invention relates to a tunable resonator of the shielded-line type.

An object of the invention is to devise a tunable resonator which may be varied in resonant frequency over a wide range by continuous variation as distinguished from step-by-step variation.

Another object is to devise a tunable resonant circuit which occupies a very small space and which is capable of being tuned over a wide range of frequencies by simple mechanical means.

Still another object is to devise a tunable oscillator circuit which operates with good stability over a wide range of frequencies.

Our improved oscillator is of the tuned-line or co-axial type. One difficulty encountered in such oscillators is the tendency of the oscillator to oscillate at frequencies corresponding to multiple quarter-wave lengths of the transmission line. One feature of our improved oscillator is the provision of a capacity feed-back between the plate and the cathode of the oscillator tube, the feed-back becoming effective only at a certain point within the tuning range of the oscillator to prevent undesired oscillation at higher modes.

Still another object of the invention is to design the tuned circuit to produce a more uniform relation between the movement of the tuning member and the variation of frequency of the circuit.

Figure 1:
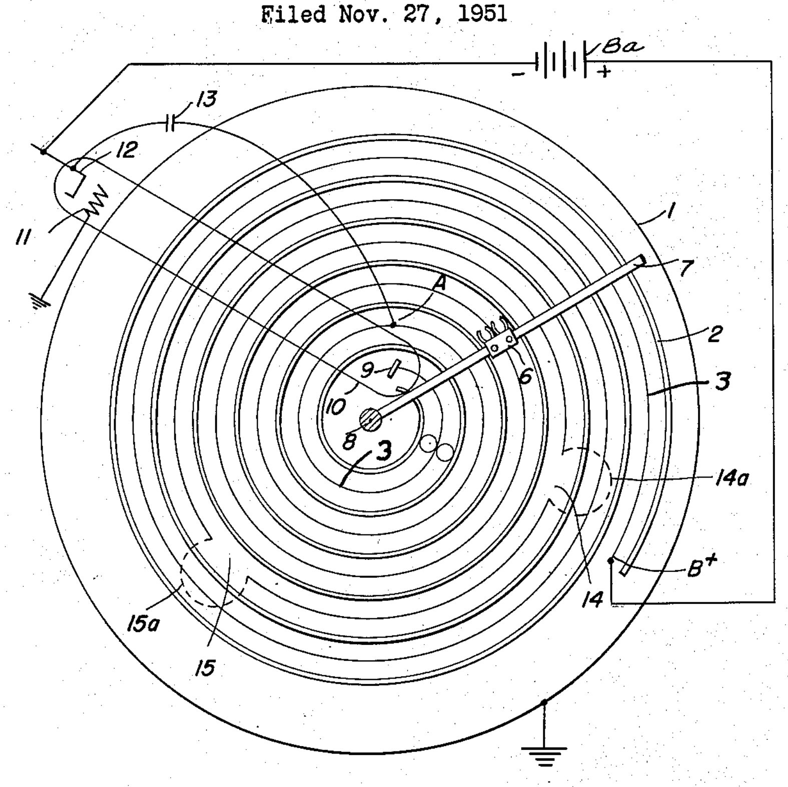
Figure 2:
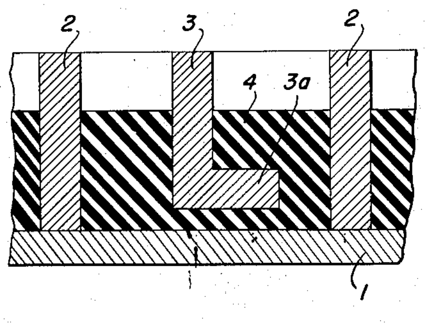

Our invention is illustrated in the accompanying drawing, in which Figure 1 is a diagrammatic representation of an electronic tube oscillator embodying our shielded-line resonator; Figure 2 is an enlarged sectional view of a portion of Figure 1 showing the shielded line at one point along its length; and Figure 3 is an enlarged sectional view similar to Figure 2, taken at a different location along the length of the shielded line, and also showing the details of the short-circuiting slider.

Referring to Figure 1, the shielded line is formed of a flat metallic plate 1 of circular outline and carrying on one face thereof a metallic strip 2 arranged in spiral formation and secured to the plate 1 along one edge thereof in any suitable manner, as by soldering, welding, or brazing. The turns of the spiral are uniformly spaced to provide a spiral trough extending from a point near the center of the plate 1 to a point adjacent the periphery of the plate. Except for the end portions of strip 2, opposite faces of this strip form the inner and outer walls, respectively, of adjacent convolutions of the spiral trough. Instead of forming the spiral trough of plate 1 and strip 2, it may be milled or cut into one face of a solid, relatively thick metal plate. A line conductor 3 is arranged centrally within the spiral trough and is supported in insulated relation with respect to plate 1 and strip 2 in any suitable manner. For example, the spiral conductor 3 may have one edge portion embedded in insulating material 4 which fills the bottom part of the trough.

Figure 3:
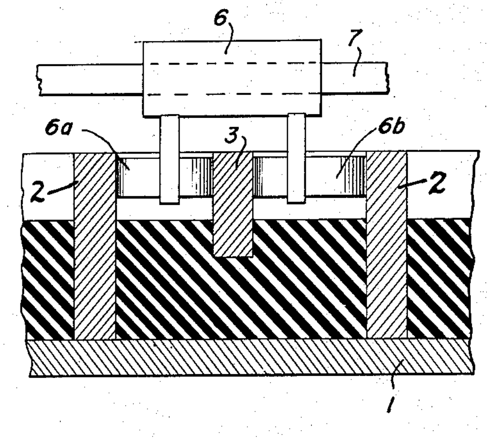

As shown in Figures 2 and 3, the line conductor 3 is formed of a metallic strip and is mounted with its upper edge located in the same plane as the upper edge of the spiral strip 2. For the purpose of varying the electrical length of the shielded line, a short-circuiting slider 6 is illustrated in Figures 1 and 3 of the drawing and involves a pair of U-shaped spring elements 5*a* and 5*b* positioned on opposite sides of the line conductor 3 and having resilient contact between conductor 3 and the opposite walls of the trough. These spring contact elements are mounted on pins extending down from slider 6 which is arranged radially of the spiral trough. Arm 7 is supported at its inner end by a shaft 8 which is mounted for rotation about an axis substantially coincident with the axis of the spiral trough. The arm 7 may be formed either of insulation or of non-conducting material, and preferably is of square section to prevent rotation of the slider 7 on the arm. The slider is free to move along the arm 7, so that, as the shaft 8 is rotated, the short-circuiting slider will move progressively along different linear portions of the line conductor 3. In this manner, the effective length of the line may be varied from a very small linear part of conductor 3 at the inner end to the entire length of the conductor when the slider is located at the outer end of conductor 3.

Our tunable shielded line may be used in a variable frequency oscillator as shown in Figure 1, although it may be used for other purposes. When used as a tuning element of an electron tube oscillator, the inner end of conductor 3 is connected to the plate 9 of a suitable electron tube 10. For example, for a tuner to cover the ultra-high frequency range from 80 megacycles to 950 megacycles, an electron tube of the 6F4 type may be used with its grid 11 connected to ground and its cathode 12 connected to the negative terminal of a suitable source of plate current represented by battery *Ba*. The positive terminal of the plate current source is connected to the outer end of conductor 3, as shown at B+. Due to the feed-back through the inherent capacity between the plate and the cathode of the tube, the arrangement shown in Figure 1 will oscillate at a frequency determined by the length of the conductor 3 included between the plate 9 and the short-circuiting slider 6. Thus, by rotating the arm 7, the frequency of the oscillator may be varied smoothly and continuously from a very high frequency when the slider 6 is at the inner end of the trough to a very much lower frequency when the slider is at the outer end of the trough.

At the low frequency end of the tuner, the oscillator tends to oscillate at undesired higher modes. This tendency is overcome by connecting a feed-back condenser 13 from the cathode to an intermediate point A on line conductor 3.

When the slider 6 is located at a point between the point A and the inner end of the spiral line, within the ultra-high frequency tuning range, the added capacity is electrically connected between the cathode and ground, and oscillations are satisfactorily sustained. When the slider is located between the point A and the outer end of the spiral line, the added capacity is effectively connected between the cathode and a tap point on the line so that the effective plate-to-cathode capacity is increased and the tendency to oscillate in a higher mode is diminished. In an actual embodiment of the tuner designed to operate over a range of frequencies from 80 megacycles per second to 950 megacycles per second, satisfactory operation was obtained with a value of one micromicro-farad for a condenser 13 where the point of connection A is at a point which results in oscillations at about 400 megacycles per second. The point A is not at all critical and could be located half a turn away with effectiveness. The value of one micromicro-farad is independent of the line dimensions but is determined by the fact that the tube requires this additional feedback capacity to oscillate at the low end of the range and not mode jump. Oscillations without mode jumping can generally be obtained down to about 250 megacycles and at this point added feedback capacity must be provided. The amount is extremely uncritical.

It is also desirable to design the resonator so that the travel of the slider over a certain frequency range is expanded and is reduced or contracted over a lower frequency range so that the angular rotation of the slider per unit band width is more linear. For example, it may be desired to expand the travel of the slider in the range from 500 to 950 megacycles and to contract the travel at lower frequencies. Since the oscillator tube imposes some capacity loading on the line, adjustment of the rate of travel of the slider is most readily accomplished by making the characteristic impedance of the line conductor as low as possible over the range from 500 to 900 megacycles, and providing a higher characteristic impedance below this range. To secure a low characteristic impedance of the line, the width of the conductor may be increased, and where the necessary width cannot be accommodated vertically within the trough, the lower edge of the line conductor may be bent parallel with the bottom of the trough, as shown at *3a* in Figure 2. This figure represents one possible shape of the line conductor over the range from 500 to 900 megacycles. The characteristic impedance of the line conductor may be increased by reducing the width of the conductor, and Figure 3 illustrates the form of the conductor employed in the low frequency section of the line. It will be understood that the width of the line conductor 3 may vary gradually from one section to the other.

Where it is desired to use the resonator to cover a broad band of frequencies in which one or more sub-bands have been reserved for other uses, these sub-bands may be excluded from the operating range of the resonator by forming a gap in the line conductor for each sub-band, and bridging each gap with an inductance element which covers the sub-band to be excluded. For example, in Figure 1 two gaps, 14 and 15, are provided at different points in conductor 3 for two sub-bands which are to be excluded, and these gaps are bridged by loop conductors **14*a* and 15*a* which may be formed of one or more turns. Conveniently, these inductance elements are mounted on the back of plate 1 and are connected across the gaps 14 and 15** through holes formed in the plate.

We claim:

1. A broad band electric resonator comprising a flat metallic plate, a metallic strip of uniform width secured along one edge thereof to one face of said plate and being arranged in a spiral formed of a number of uniformly spaced convolutions, said plate and said strip forming a spiral trough, a line conductor, insulating means supporting said line conductor within said trough throughout the length of said trough, and a slider mounted for movement along said trough for establishing a sliding short-circuiting connection between said line conductor and said spiral strip, said line conductor being formed of a metallic strip of uniform thickness mounted with its broad face arranged parallel with the axis of said spiral, and said line conductor strip having a width which varies along the length of said conductor.

2. A broad band oscillator comprising a flat metallic structure having a spiral trough formed in one face thereof a line conductor, insulating means supporting said line conductor within said trough throughout the length of said trough, a short-circuiting slider mounted for movement along said trough and establishing a sliding connection between said conductor and one wall of said trough, an electron tube having a cathode, a grid and a plate, a connection for grounding said grid, a connection from said cathode to the negative terminal of a source of current, a connection from said plate to one end of said line conductor, a connection from the other end of said line conductor to the positive terminal of said source, and a condenser connected between said cathode and said line conductor at a point within the range of movement of said short-circuiting slider.

3. A broad band oscillator comprising a flat metallic structure having a spiral trough formed in one face thereof, a line conductor, insulating means supporting said line conductor within said trough throughout the length of said trough, a short-circuiting slider mounted for movement along said trough and establishing a connection between said conductor and one wall of said trough, an electron tube having a cathode, a grid and a plate, a connection for grounding said grid, a connection from said cathode to the negative terminal of a source of current, a connection from said plate to the inner end of said line conductor, a connection from the outer end of said line conductor to the positive terminal of said source, and a condenser connected between said cathode and said line conductor at a point within the range of movement of said short-circuiting slider.

4. A broad band oscillator comprising a shielded line conductor, an electron tube having a cathode, a grid and a plate, a connection for grounding said grid, a connection from said cathode to the negative terminal of a source of current, a connection from said plate to one end of said line conductor, a connection from the other end of said line conductor to the positive terminal of said source, a short-circuiting slider movable along said line for varying the effective length of the line, and a condenser connected between said cathode and said line conductor at a point within the range of movement of said short-circuiting slider.

5. A broad band electric resonator comprising a flat metallic plate, a metallic strip of uniform width secured along one edge thereof to one face of said plate and being arranged in a spiral formed of a number of uniformly spaced convolutions, said plate and said strip forming a spiral trough, a line conductor, insulating means supporting said line conductor within said trough throughout the length of said trough, a slider mounted for movement along said trough for establishing a sliding short-circuiting connection between said line conductor and said spiral strip, said line conductor being interrupted by a gap therein at a point intermediate the ends of said spiral trough, and an inductance element connected across said gap.

6. A broad band electric resonator comprising a flat metallic plate, a metallic strip of uniform width secured along one edge thereof to one face of said plate and being arranged in a spiral formed of a number of uniformly spaced convolutions, said plate and said strip forming a spiral trough, a line conductor formed of a second metallic strip of uniform thickness, insulating means supporting said second strip within said trough throughout the length of said trough with its broad face arranged parallel with the axis of said spiral and having its outer edge arranged in the same plane with the outer edge of said first metallic strip, and a slider mounted for movement along said trough for establishing a sliding short-circuiting connection between said line conductor and said spiral strip, said slider comprising a pair of spring contacts arranged on opposite sides of said second strip and bridging the gaps between said second strip and said first strip.

References Cited in the file of this patent

UNITED STATES PATENTS

| | | |
|---|---|---|
| 1,339,772 | Lowenstein | May 11, 1920 |
| 2,126,541 | De Forest | Aug. 9, 1938 |
| 2,163,645 | Ware | June 27, 1939 |
| 2,232,042 | Alford | Feb. 18, 1941 |
| 2,362,470 | De Rosa | Nov. 14, 1944 |